United States Patent

Adachi

[11] 4,181,371
[45] Jan. 1, 1980

[54] POWER BRAKE CONTROL VALVE FOR VEHICLES

[75] Inventor: Yoshiharu Adachi, Gamagoori, Japan

[73] Assignee: Aisin Seiki Kabushiki Kaisha, Kariya, Japan

[21] Appl. No.: 870,438

[22] Filed: Jan. 18, 1978

[30] Foreign Application Priority Data

Jan. 18, 1977 [JP] Japan .................... 52/4194

[51] Int. Cl.$^2$ ............... B60T 13/16; B60T 13/14
[52] U.S. Cl. ................................ 303/50; 303/10;
60/547 B; 60/582; 91/32
[58] Field of Search ............. 60/547, 548, 552, 553,
60/554, 547 B, 582, 591, 405, 413; 303/9, 10,
85, 50; 137/627.5; 91/5, 6, 32

[56] References Cited

U.S. PATENT DOCUMENTS

| | | | |
|---|---|---|---|
| 3,539,227 | 11/1970 | Drutchas | 303/10 |
| 3,633,363 | 1/1972 | Larsen | |
| 3,918,765 | 11/1975 | Hayashida | 60/582 |
| 3,995,529 | 12/1976 | Bach | 60/413 |

*Primary Examiner*—Abraham Hershkovitz
*Attorney, Agent, or Firm*—Oblon, Fisher, Spivak, McClelland & Maier

[57] ABSTRACT

A power brake control device for vehicles disposed between a manual brake operating member and wheel brake members which includes an accumulator, a housing including a first inlet port connected to a hydraulic pressure source, a second inlet port connected to the accumulator hydraulically disposed and interconnected between the pressure source and the first inlet port, a first outlet port hydraulically connected to the wheel brake members and a second outlet port connected to the reservoir. A spool valve is also slidably disposed within the housing and is movable by operation of the manual brake operating member for controlling hydraulic communication between the first inlet and the second outlet port with a piston being slidably disposed within the housing for connecting the first outlet port with the first inlet port, one end of the piston being secured to the spool valve for unitary movement therewith. An emergency valve is also disposed within the housing between the second inlet port and the first outlet port and also disposed adjacent an end of the piston opposite the one end wherein the piston is movable between a first position in which the fluid from the first inlet port under pressure, controlled by the spool valve, is in hydraulic communication with the first outlet port and a second position in which the end opposite the one end of the piston is engaged with the emergency valve, wherein the emergency valve is actuated to first interrupt hydraulic communication between the first inlet port and the first outlet port and to thereafter establish hydraulic communication between the second inlet port and the first outlet port.

8 Claims, 4 Drawing Figures

POWER BRAKE CONTROL VALVE FOR VEHICLES

BACKGROUND OF THE INVENTION

1. Field of the Invention

This invention relates to a power brake control valve for a vehicle hydraulic system.

2. Description of the Prior Art

Although an emergency valve member is provided in U.S. Pat. No. 3,633,363 to Larsen, for supplying accumulator pressure upon failure of the pump, the accumulator pressure is transmitted to the hydraulic chamber through a spool valve member whereas the emergency valve of the present invention directly supplies the accumulated pressure to the wheel brake cylinder members without passing through a spool valve. Therefore, in the present invention, the loss or leakage of accumulator pressure may be prevented which might customarily occur when the fluid passes through any spool valve member having lands and grooves.

SUMMARY OF THE INVENTION

An important object of the present invention is to provide a fail-safe apparatus for supplying hydraulic pressure to brake members upon failure of pump pressure in a vehicle hydraulic system.

Another object of the present invention is to provide a fail-safe apparatus connected to brake members and being operable by a pressure in an accumulator which accumulates pressure therein during normal braking operation.

A further object of the present invention is to provide a new power brake control valve assembly operable so as to supply pressure from an accumulator to wheel brake cylinders upon failure of a pressure source in the form of, for example, a pump.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
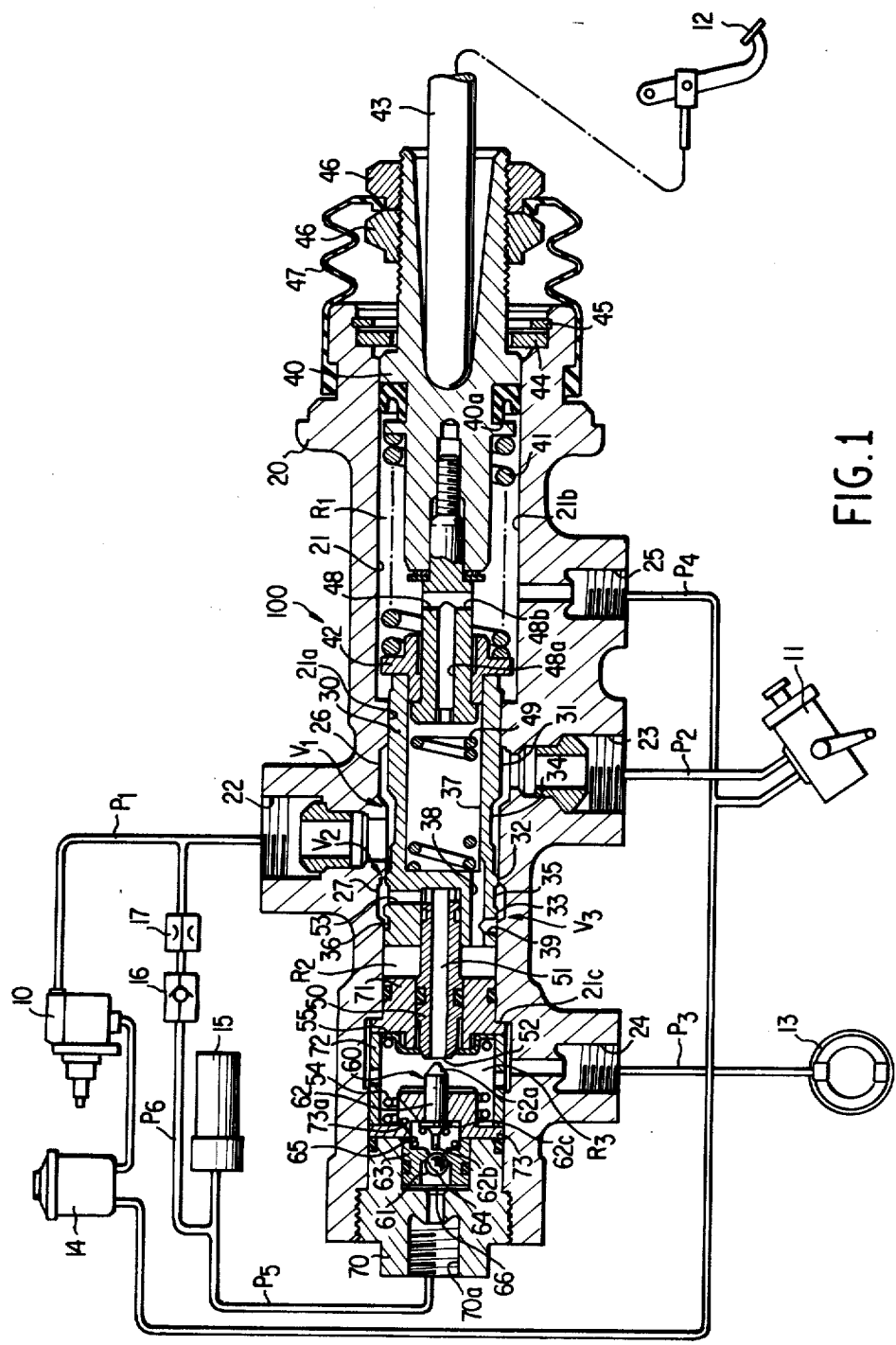
FIG. 1 is a cross-sectional view of a first embodiment of the present invention.

Referring now to the drawings, and in particular FIG. 1, a hydraulic pump 10 is disclosed which is driven by an engine, not shown, and is hydraulically connected to a power steering unit 11, which is driven by hydraulic pump 10, or a similar hydraulically actuated device such as a hydraulic clutch member or the like. Hydraulic pump 10 is also operably connected to brake pedal 12 which serves to actuate a plurality of wheel brake cylinders 13.

Also hydraulically connected to hydraulic pump 10 are reservoir 14 and accumulator 15 with a check valve 16 and restriction orifice being disposed between hydraulic pump 10 and accumulator 15 such that the accumulator 15 can be utilized upon breakage or failure of hydraulic pump 10.

Control valve member 100 is provided for supplying brake pressure to the wheel brake cylinders 13 upon depression of brake pedal 12 which, in turn, is secured to a suitable portion of the vehicle body supporting the engine. Control valve member 100 includes a housing 20 with a stepped bore 21 provided therein and including a reduced diameter portion 21a and a large diameter portion 21b.

Control valve member 100 further includes a first inlet port 22 fluidically connected to hydraulic pump 10 and a second outlet port 23 hydraulically connected to reservoir 14 through power steering unit 11. A first outlet port 24 is also provided in housing 20 which hydraulically communicates with wheel brake cylinders 13 with a third outlet port 25 being directly hydraulically communicated with reservoir 14 and with second inlet port 70a providing a fluidic connection from accumulator 15 to the housing 20.

Annular grooves 26 and 27 are provided in the reduced diameter portion of the step bore 21 provided in housing 20 and are located adjacent to and on opposite sides of the first inlet port 22. A spool 30 is slidably disposed in bore portion 21a and is provided with lands 31, 32, and 33 on the outer periphery of spool 30. Spool 30 is further provided on the outer periphery with annular grooves 34, 35, and 36 and includes a bore 37 partially extending along the longitudinal axis of spool 30. A passage 38 is also provided in spool 30 for hydraulic communication with bore 37 and is also hydraulically connected to radial passage 39 for fluidic communication between groove 36 and passage 38.

The above-noted structure serves to form a throttle valve $V_1$ which includes grooves 34 and 26 as well as land 31 for throttling the communication between grooves 34 and 26, and, in turn, fluidic communication between first inlet port 22 and second outlet port 23. A normally closed cut valve $V_2$ is formed by groove 27, first inlet port 22 and land 32 for controlling hydraulic communication between groove 27 and first inlet port 22 only for the purpose of establishing or interrupting hydraulic operation therebetween. Grooves 27 and 36 as well as land 33 form normally open cut valve $V_3$ for controlling hydraulic communication between grooves 27 and 36 through passage 39.

An input piston 40 is slidably disposed in bore portion 21b of housing 20 and includes a flange 40a with a spring 41 disposed within bore portion 21b between flange 40a and spool 30. A spring retainer 42 serves to retain spring 41 at an end portion thereof adjacent to spool 30.

A push rod 43 is operatably connected to brake pedal 12 and input piston 40 while a stopper 44 is disposed in an end portion of housing 20 adjacent to push rod 43 for limiting the rightward movement of input piston 40 and which is secured by clip 45 to housing 20 for securing stopper 44 within housing 20.

A pair of nuts 46, 46 are threadedly secured to input piston 40 at the end portion thereof adjacent to push rod 43. Dust boot 47 has one end secured to housing 40 and the other end secured between nuts 46, 46 for preventing penetration of dust, water, or the like.

A plunger 48 is disposed within housing 20 so that one end thereof is screwed to input piston 40 and the other brimmed end engages with spring retainer 42. Passages 48a and 48b are disposed within plunger 48 for fluidic communication between bore 37 and bore portion 21b which, in turn, communicates with first outlet port 25. Spring member 49 is disposed in bore 37 of spool 30 for providing a good feeling or indication of initial pedal depression to the operator.

A reaction piston 50 is also disposed within housing 20 and includes a right end thereof fixedly secured to spool 30 with the left end thereof slidably disposed in a partition wall 71.

An axial bore 51 is provided in piston 50 and provides fluidic communication between a radial passage 53 provided in spool 30 and chamber $R_3$. Valve seat 52 is disposed at the left end front surface of reaction piston 50 with radial passage 53 providing fluid communication between annular groove 27 and axial bore 51. Spring 54 is disposed within housing 20 at the left end portion thereof and serves to normally bias reaction piston 50 to the right. Spring 54 is retained at one end portion by spring retainer 55 disposed adjacent reaction piston 50.

Valve member 60 is disposed at the left end portion of housing 20 and is operable upon failure of hydraulic pump 10. Valve member 60 includes a ball valve 61 and a spool valve 62 located adjacent to the ball valve 61 and is provided with a conical portion 62a operable to seat on valve seat 52 to interrupt hydraulic communication between chamber $R_3$ and axial bore 51. A projection 62b is disposed at an end of spool valve 62 opposite that of conical portion 62a and is operable to separate ball valve 61 from valve seat 64. Brim portion 62c is also provided on spool valve 62 for receiving a spring 65 normally separating projection 62b from engagement with ball valve 61. A seat member 63 is located adjacent brim portion 62c and includes a valve seat 64 for seating ball valve 61 thereon. A second valve seat 66 is located at an opposite side of ball valve 61 from that adjacent to valve seat 64 for seating thereon ball valve 61 when the pressure in accumulator 15 is below a predetermined value.

Plug member 70 threadingly engages the left end portion of housing 20, within which is disposed second inlet port 70a. Partition wall 71 is disposed within housing 20 between spring retainer 55 and the left end portion of spool 30 and serves to seatingly engage external portion of reaction piston 50. A holder 73 is also disposed within housing 20 adjacent plug member 70 for preventing movement of seat member 63. A spacer 72 is also provided between holder 73 and spring retainer 55 and serves to secure partition wall 70 and holder 73 by engagement with plug 70 being threadingly engaged with housing 20. A passage 73a is further provided in holder 73 for introducing fluid under pressure from accumulator 15 into chamber $R_3$ upon the opening of ball valve 61.

Conduit $P_1$ serves to interconnect hydraulic pump 10 with first inlet port 22 while conduit $P_2$ fluidically connects second outlet port 23 with power steering unit 11. First outlet port 24 is hydraulically connected to wheel brake cylinders 13 via conduit $P_3$ with the third outlet port 25 being directly fluidically connected to reservoir 14 by conduit $P_4$. Conduit $P_5$ hydraulically communicates second inlet port 70a with accumulator 15 while conduit $P_6$ hydraulically communicates conduit $P_5$ with conduit $P_1$ and has disposed therein check valve 16 and restriction orifice 17.

Chamber $R_1$ is formed by board portion 21b in housing 20 while chamber $R_2$ is formed between partition wall 71 and spool 30. Moreover, chamber $R_3$ is formed adjacent axial bore 51 in reaction piston 50 for supplying pressure to the wheel brake cylinders either from hydraulic pump 10 or from accumulator 15 via first outlet port 24.

The operation of the embodiment of FIG. 1 will now be described. In a normal operation where hydraulic pump 10 is being driven, the positions of the elements described above are illustrated as set forth in FIG. 1. As a result of hydraulic pressure generation in hydraulic pump 10, hydraulic pressure is supplied from hydraulic pump 10 via conduit $P_1$ to first inlet port 22, which in turn is hydraulically communicated with annular groove 34, throttle valve $V_1$, annular groove 26, second outlet port 23, conduit $P_2$, power steering unit 11, conduit $P_4$, reservoir 14 and, in turn, to hydraulic pump 10 such that no pressure increase exists in the fluid system. At this time, wheel brake cylinders 13 are in communication with reservoir 14 via conduit $P_3$, first outlet port 24, chamber $R_3$, axial bore 51, radial passage 53, annular groove 27, annular groove 35, normally open cut valve $V_3$, radial passage 39, passage 38, bore 37, passage 48a, passage 48b, chamber $R_1$, third outlet port 25, and conduit $P_4$ such that no pressure increase exists in the fluid conduit. Fluid under pressure in accumulator 15 is communicated to second inlet port 70a via conduit $P_5$ so that ball valve 61 is seated on the valve seat 64.

Under operation of power steering unit 11, pressurized fluid exists in conduit $P_2$ and the fluid conduit which includes second outlet port 23, annular groove 26, annular groove 34, as well as first inlet port 22 and conduit $P_1$ is communicated to accumulator 15 via restriction orifice 17, and check valve 16 disposed in conduit $P_6$.

During braking operation, brake pedal 12 is depressed and input piston 40 is moved to the left via spring 41 and spring retainer 42 so that spool 30 also moves to the left. As a result, normally open cut valve $V_3$ is closed, thus interrupting fluidic communication between wheel brake cylinders 13 and reservoir 14 while normally closed cut valve $V_2$ is opened so as to establish hydraulic communication between wheel brake cylinders 13 and hydraulic pump 10. Throttle valve $V_1$ is also throttled so as to establish hydraulic pressure in annular groove 34 and first inlet port 22. When the braking operation is initiated during power steering operation, throttle valve $V_1$ is not necessarily actuated. Therefore, in such cases land 31 merely moves to the left.

As a result of the braking operation, a reaction force is generated due to the pressure existing in chamber $R_3$ which thus causes a reaction via reaction piston 50, spool 30, input piston 40, and, in turn, brake pedal 12. Therefore, pressure in chamber $R_3$ is increased in proportion to the operation force of the brake pedal 12 depression.

With regard to accumulator 15, when the pressure in accumulator 15 is lower than the pressure in chamber $R_3$, ball valve 61 is separated from valve seat 64 due to a pressure differential across ball valve 61, but, simultaneously seats on valve seat 66 to interrupt the fluidic communication between chamber $R_3$ and accumulator 15. During braking operation, as is similar to the power steering operation, the pressure in conduit $P_1$ is introduced into accumulator 15 through orifice 17 and check valve 16 to gradually accumulate pressure in accumulator 15.

Upon release of brake pedal 12, all the elements described hereinabove return to their non-operational condition as shown in FIG. 1.

The fail-safe operation characteristic of the present invention upon failure of hydraulic pump 10 will now be described. Upon depression of brake pedal 12, input piston 40 is moved to the left along with spool 30 and in turn causes leftward movement of reaction piston 50. As a result, normally open cut valve $V_3$ is closed and valve seat 52 is moved to the left so as to be engaged with conical portion 62a of spool valve 62. In response thereto, ball valve 61 is separated from valve seat 64 by engagement with projection 62b and fluid under high pressure from accumulator 15 is introduced into chamber $R_3$ via passage 73a.

If brake pedal 12 is released during the fail-safe operation resulting from a failure of hydraulic pump 10, a rightward movement of reaction piston 50, spool 30, and piston 40 is caused by the pressure in chamber $R_3$ and the spring force of spring 54, thus returning the pressurized fluid in wheel brake cylinder 13 to reservoir 14 through axial passage 51. The rightward movement of spool valve 62 by the spring force of spring 65 serves to interrupt the supply of fluid under pressure from accumulator 15.

Figure 2:
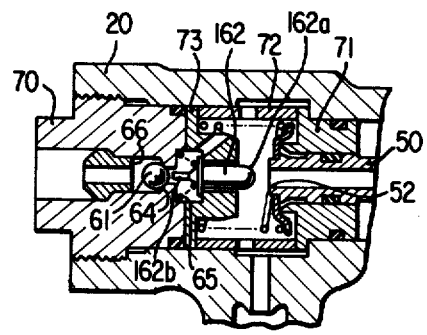
FIG. 2 is a cross-sectional view of a modification of a power brake control assembly shown in FIG. 1.

A second embodiment of the present invention, and more particularly the valve member 60 of FIG. 1, will now be discussed with reference to FIG. 2. In this embodiment a spherical portion 162a is substituted for conical portion 62a of FIG. 1 in spool valve 62. Moreover, spool valve 62 of FIG. 1 is replaced with an axially slidable spool valve 162 which is, to some extent, permitted to be radially tiltable so that even if the axial center of valve seat 52 disagrees with that of spool valve 162, valve seat 52 and spherical portion 162a may be engageable by tilting movement of spool valve 162. Otherwise, the operation of the embodiment of FIG. 2 is identical to that of FIG. 1 discussed hereinabove.

Figure 3:
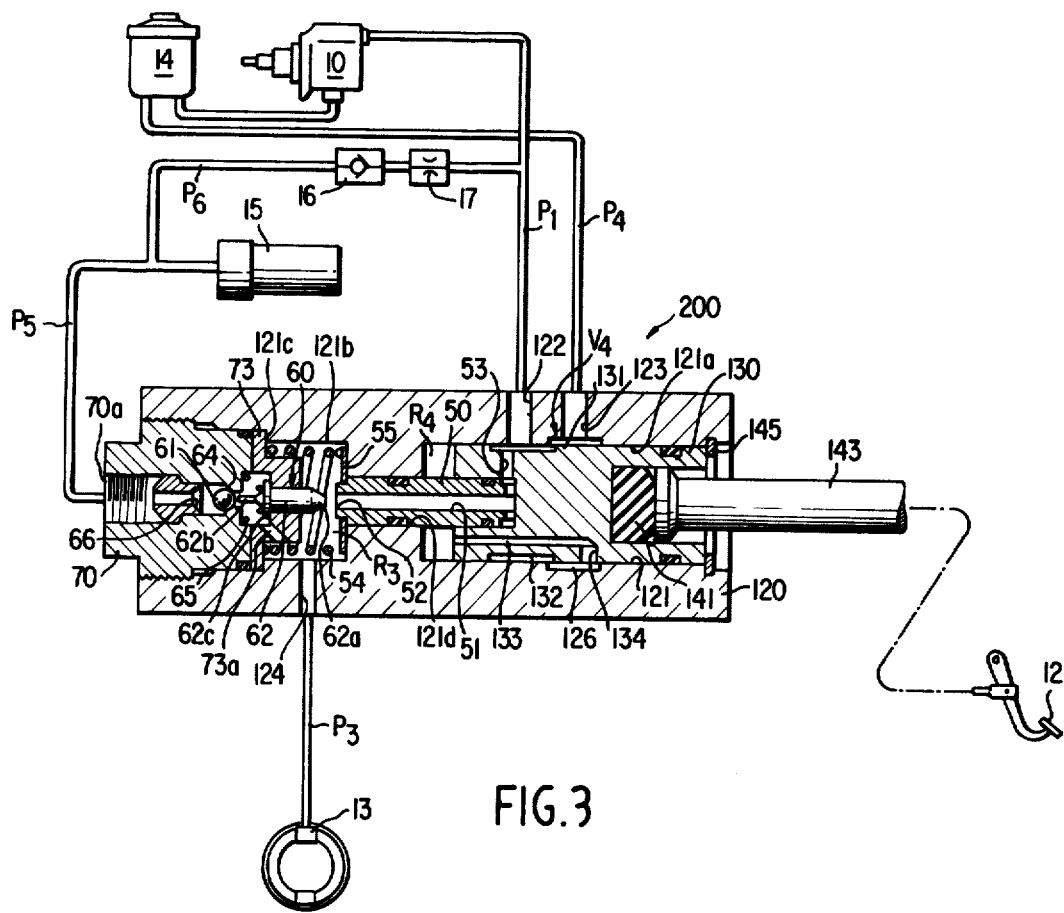
FIG. 3 is a cross-sectional view of a second embodiment of the present invention; and, FIG. 4 is a cross-sectional view of a third embodiment of the present invention.

FIG. 3 illustrates a third embodiment of the present invention with the main difference in the third embodiment versus the first embodiment being that the power steering unit 11 is removed and thus, the third embodiment is adapted for a vehicle with manual steering.

Now referring to FIG. 3, a control valve member 200 is provided within housing 120, with housing 120 including a stepped bore 121 which further includes three bore portions 121a, b and d as well as one shoulder 121c. Housing 120 is provided with a first inlet port 122 fluidically connected with hydraulic pump 10 and with a second outlet port 123 directly hydraulically connected to reservoir 14 without interconnection with a power steering unit. Wheel brake cylinders 13 are hydraulically connected to first outlet port 124 while accumulator 15 is similarly connected to second inlet port 70a.

Annular groove 126 is provided in bore portion 121a. Spool 130 is disposed within housing 120 with land 131 being provided on spool 130. Also provided on spool 130 are annular groove 132, passage 133, and passage 134. Resilient member 141 is disposed between an end portion of a bore disposed in the right hand side of spool 130 and an end portion of push rod 143 disposed within the bore. Clamp 145 is secured to housing 120 and serves to limit the rightward disposition of spool 130 in housing 120.

A chamber $R_4$ is disposed between a flange portion of housing 120 and an end portion of spool 130 and serves to circumferentially surround a portion of reaction valve 50. Throttle valve $V_4$ is also provided and is formed from the intercooperation of land 131 with grooves 132 and 126. The other structural elements in the third embodiment of the present invention are the same or substantially the same as that set forth in the embodiment of FIG. 1.

Figure 4:
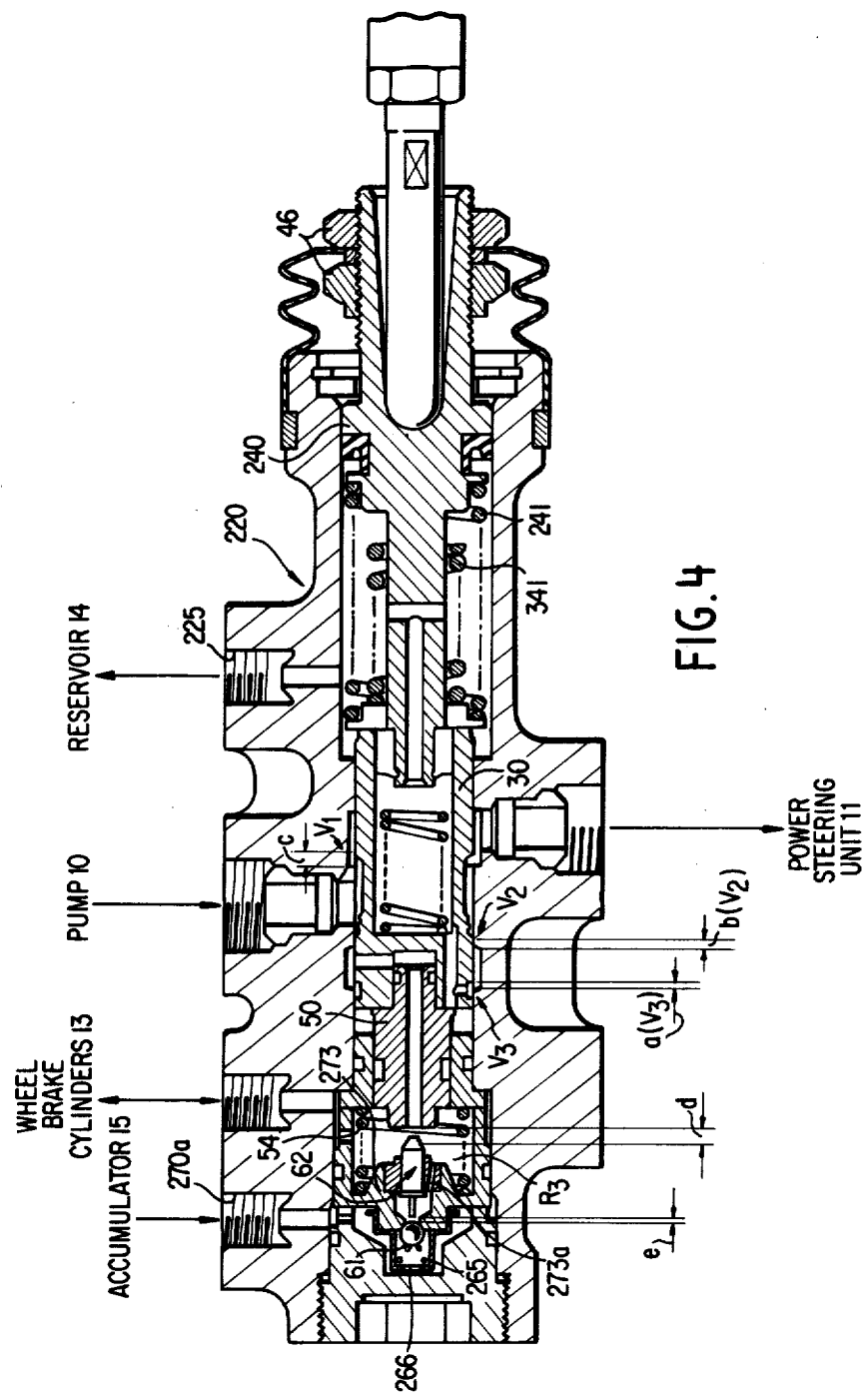

FIG. 4 discloses a fourth embodiment of the present invention which again, utilizes many structural elements which are similar to those set forth in the first embodiment of FIG. 1. In this regard, the structural differences of the fourth embodiment with the embodiment shown in FIG. 1 are discussed hereinbelow.

Second inlet port 270a is disposed in the left upper portion of housing 220 and serves to fluidically communicate housing 220 with accumulator 15. Third outlet port 225 is disposed in the upper portion of housing 220 and serves to fluidically communicate housing 220 with reservoir 14 in a manner similar to that of the embodiment of FIG. 1.

Input piston 240 includes a one-piece structure such that the plunger 48 of the embodiment of FIG. 1 is unitarily formed with input piston 40 to form input piston 240. The structure corresponding to spring 41 in the FIG. 1 embodiment is replaced in this embodiment by a first spring 241 and second spring 341 concentrically disposed along the longitudinal axis of input piston 40, with the right end portions of spring 241, 341 being retained by flange elements provided on input piston 40 and with the left ends thereof being retained by a spring retainer similar to that of spring retainer 42 in FIG. 1.

The embodiment of FIG. 4 utilizes a valve seat 266 in its valve member which is secured to a flange portion of a holder 273 such that ball valve 61 is biased by a spring disposed between ball valve 61 and valve seat 266. A passage 273a similar to that of passage 73a in FIG. 1 is also provided in holder 273.

The stroke of valve means $V_1$, $V_2$, and $V_3$ as well as valve member 60 is disclosed by distance c, b, a, and d, respectively, whose structural interrelationship is defined by the relation a < b such that a < b < c < d. Therefore, upon brake operation, initially, valve $V_3$ is closed, thus interrupting fluidic communication between wheel brake cylinders 13 and reservoir 14. Subsequently valve $V_2$ is opened so as to establish hydraulic communication between wheel brake cylinders 13 and hydraulic pump 10 and then, $V_1$ is throttled, thus raising pressure in wheel brake cylinders 13. Upon releasing of brake pedal 12 under a fail-safe operation, spool valve 62 is opened to discharge fluid in chamber $R_3$ only after ball valve 61 is in a closed position. Thus, the pressure accumulated in accumulator 15 may be effectively used without any loss to reservoir 14.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power brake control device for vehicles disposed between a manual brake operating means and wheel brake means, which comprises:
   an accumulator;
   a housing including a first inlet port means connected to a hydraulic pressure source, a second inlet port means connected to said accumulator, said accumulator being hydraulically disposed and interconnected between said pressure source and said first inlet port means;

a first outlet port means hydraulically connected to said wheel brake means and a second outlet port means connected to reservoir means;

spool valve means slidably disposed within said housing and movable by operation of said manual brake operating means for controlling hydraulic communication between said first inlet and second outlet port means;

piston means slidably disposed within said housing for connecting said first outlet port means with said first inlet port means, one end of said piston means being secured to said spool valve means for unitary movement therewith;

an emergency valve means disposed within said housing between said second inlet port means and first outlet port means and also disposed adjacent an end of said piston means opposite said one end, said piston means being movable between a first position in which the fluid from said first inlet port means under pressure controlled by said spool valve means is in hydraulic communication with said first outlet port means and a second position in which said end opposite said one end of said piston means is engaged with said emergency valve means, wherein said emergency valve means is actuated to first interrupt hydraulic communication between said first inlet port means and said first outlet port means and to thereafter establish hydraulic communication between said second inlet port means and said first outlet port means.

2. A power brake control device as set forth in claim 1, which further comprises a hydraulically actuated means hydraulically connected to said reservoir wherein said second outlet port means includes a first outlet port connected to said hydraulically actuated means and a second outlet port directly connected to said reservoir means, said second outlet port being selectively hydraulically connected to said first outlet port means through said piston means.

3. A power brake control device as set forth in claim 2, wherein:

said spool valve means further includes a cut valve disposed between said second outlet port of said second outlet port means and said first outlet port means for interrupting the hydraulic communication therebetween when said piston means is moved to said first position.

4. A power brake control device as set forth in claim 1, wherein:

said emergency valve means comprises:
a spool valve;
a ball valve; and,
means for biasing said spool valve from engagement with said ball valve.

5. A power brake control device as set forth in claim 4, wherein;

said spool valve is axially shiftable and includes a conical shaped end portion located adjacent said piston means.

6. A power brake control device as set forth in claim 4, wherein:

said spool valve is axially shiftable including a spherically shaped end portion which is radially tiltably engageable with said piston means.

7. A power brake control device as set forth in claim 1, wherein:

said second outlet port means includes a port directly connected to said reservoir means, said port being selectively hydraulically connected to said first outlet port means through said piston means.

8. A power brake control device as set forth in claim 7, wherein:

said spool valve means further comprises a cut valve disposed betweeen said second outlet port means and said first inlet port means.

* * * * *